United States Patent [19]

Dellinger et al.

[11] Patent Number: 4,666,105
[45] Date of Patent: May 19, 1987

[54] UNMANNED AIRCRAFT

[75] Inventors: Juergen Dellinger, Achim-Uesen; Hans-Jochen Hoeppner, Bremen; Ulrich Kraemer, Syke-Barrien, all of Fed. Rep. of Germany

[73] Assignee: Messerschmitt-Boelkow-Blohm GmbH, Bremen, Fed. Rep. of Germany

[21] Appl. No.: 784,484

[22] Filed: Oct. 4, 1985

[30] Foreign Application Priority Data

Oct. 10, 1984 [DE] Fed. Rep. of Germany ....... 3437174

[51] Int. Cl.$^4$ .............................................. B64F 1/04
[52] U.S. Cl. ..................................................... 244/63
[58] Field of Search ............................ 244/58, 63, 74; 89/1.81; 102/377

[56] References Cited

U.S. PATENT DOCUMENTS

| 2,982,497 | 5/1961 | Worley | 244/58 |
| 3,007,372 | 11/1961 | Baxter | 244/63 |
| 3,329,089 | 7/1967 | Harrison | 102/377 |
| 4,183,302 | 1/1980 | Schillreft | 102/377 |
| 4,410,151 | 10/1983 | Hoppner et al. | 244/63 |

Primary Examiner—Galen Barefoot
Assistant Examiner—Rodney A. Corl
Attorney, Agent, or Firm—Ralf H. Siegemund

[57] ABSTRACT

An unmanned craft having a fuselage, a propeller drive with a propeller being arranged in the tail portion of the fuselage for purposes of cruising, and a rocket assist propulsion system for the takeoff phase is releasably mounted to the fuselage, the improvement includes three spring biased thrust rods being secured to the frame and releasably engaging peripheral points of the craft. The thrust rods are radially pivotal in outer direction. Support points on the wings and the rudder engage front ends of the rods in contourmatching relationship but are disengageable therefrom.

5 Claims, 7 Drawing Figures

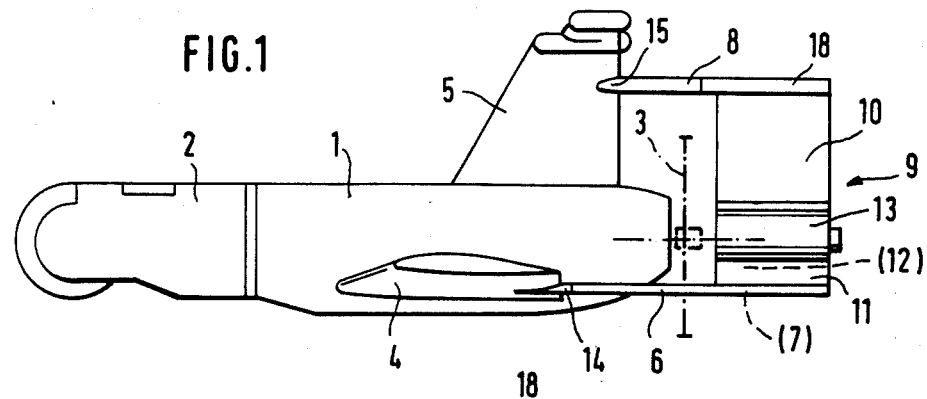
FIG.1
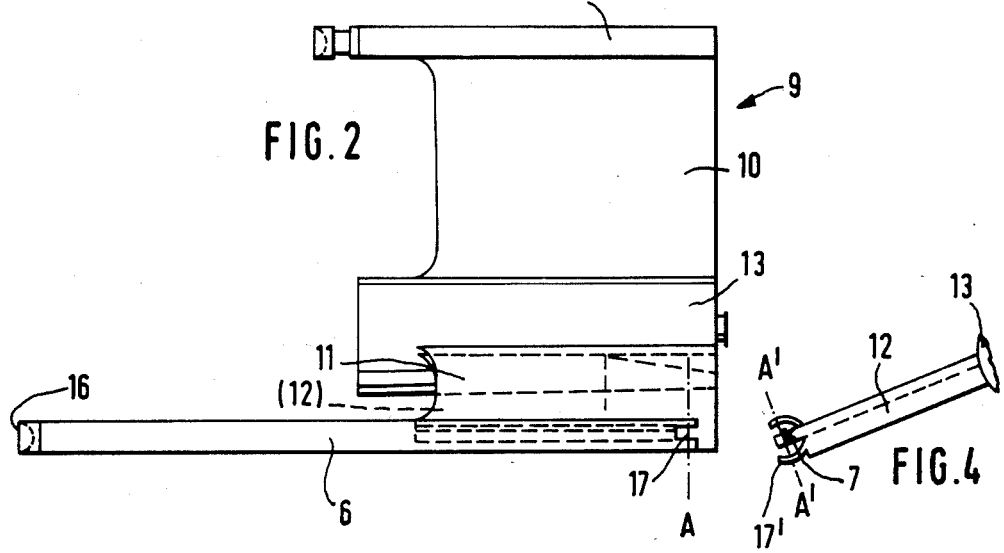
FIG.2
FIG.4
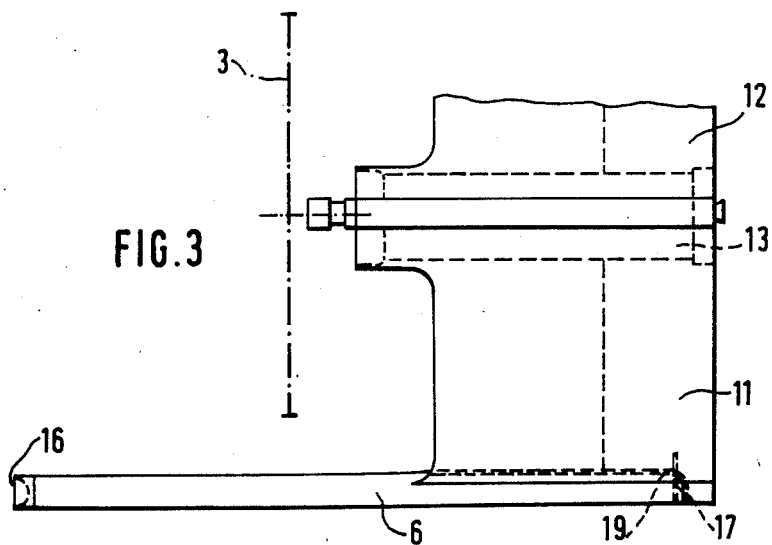
FIG.3

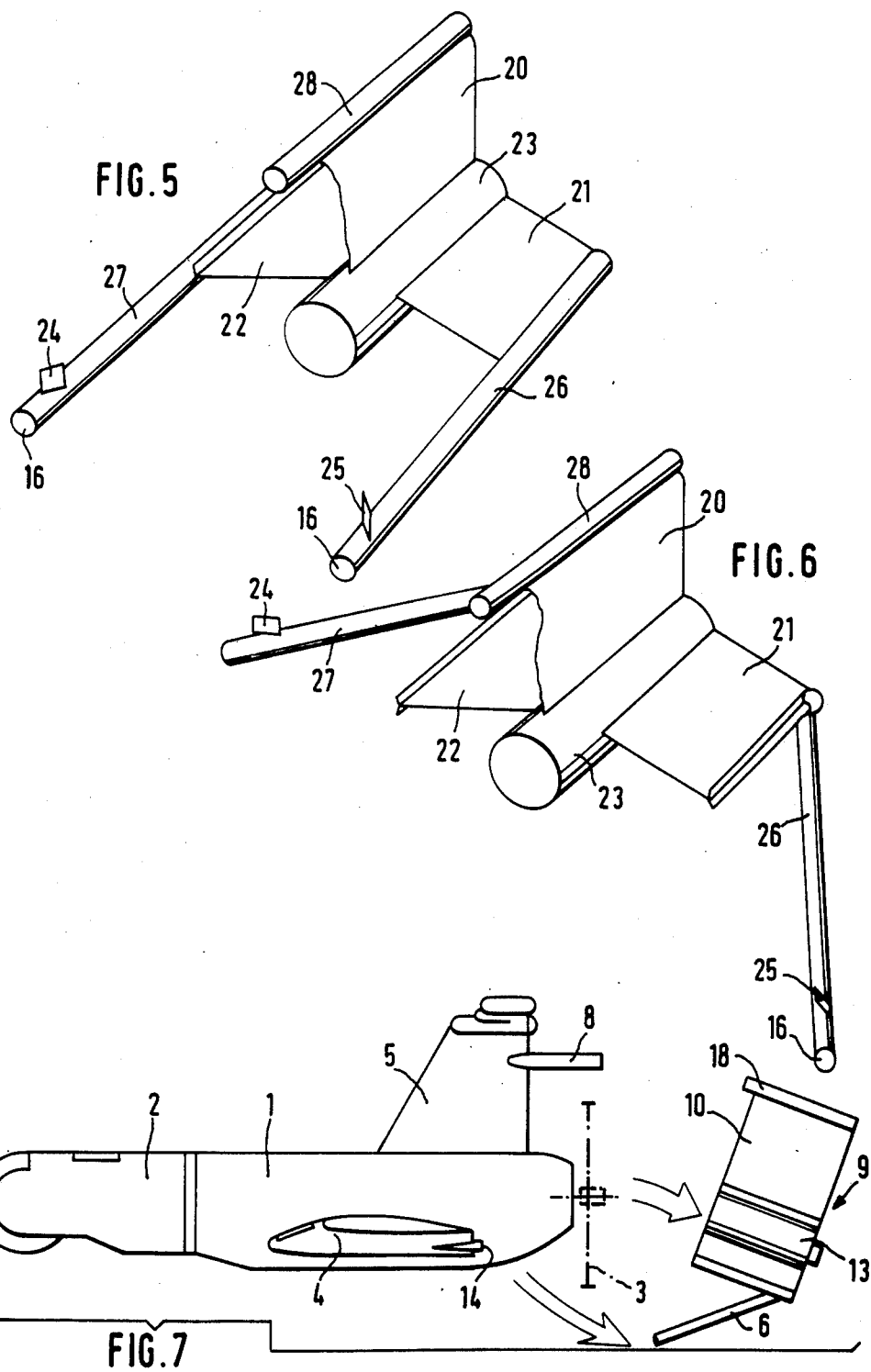

UNMANNED AIRCRAFT

BACKGROUND OF THE INVENTION

The present invention relates to an unmanned aircraft with a propeller drive arranged in the rear or tail end of the craft for regular cruising and including, further, a releasable rocket propulsion system arranged behind the propeller and to be used for takeoff. More particularly, the invention relates to a rocket assist device for starting an unmanned aircraft wherein the rocket propulsion system provides thrust to be transmitted via thrust rods upon the fuselage of the craft to which the propulsion system pertains whereby these thrust rods are peripherally arranged between a frame carrying the rocket propulsion drive and the rear or trailing edges of wings as well as of guide surfaces of the craft.

Aircraft of the type to which the invention pertains generally are, for example, disclosed in U.S Pat. Nos. 4,471,923 and 4,410,151. They are, for example, launched from a transport container or silo, and are subsequently used, for example, for reconnaissance. Herein, thrust rods extend from the trailing edges of control surfaces as well as from the airfoils and they are secured thereto. These rods extend in rearward direction and bear against appropriate surfaces in the outer portion of a star-like arranged rocket frame. The propeller is usually started prior to takeoff and moves within the space arranged between the aircraft and the rocket frame, which space is further limited in radial direction by the aforementioned thrust rods. After the shutdown of the rocket assist propulsion device, i.e., more particularly after the thrust provided by this rocket assist device has dropped below the thrust provided by the propeller drive, the rocket assist device with frame automatically disconnects from the craft and drops to ground.

DESCRIPTION OF THE INVENTION

It is an object of the present invention to improve the construction of aircraft with rocket assist device of the type mentioned above, still using the concept of a central thrust production by means of a rocket assist propulsion system whereby the thrust direction is on a line that traverses the center of gravity of the craft involved. However, the flight performance of such a device is to be improved whereby, particularly, attention is paid primarily towards obtaining a flawless separation between the aircraft and the rocket assist device, bearing in mind that the craft should be reusable, i.e., subject to safe landing.

In accordance with the preferred embodiment of the present invention, it is suggested to provide at least two thrust rods and firmly connect them with a frame for a rocket assist device, but they are constructed to permit radial outward pivoting while front ends of the thrust rods facing the fuselage are connected in contourmatching relationship to appropriate connecting points of the wings of the craft, the connection being effective during the takeoff phase. Pivoting of the thrust rods is to be carried out by means of a spring or springs on the thrust rods and could be provided with their own vane-like guide sheets. The thrust rods are adjustably connected during the takeoff phase with the rocket frame. Moreover, the respective pivot axes of the thrust rods are radially offset by a certain distance vis-a-vis the respective longitudinal axis.

The aircraft, in accordance with the invention, has the advantage that a collision between the propeller and any of the thrust rods is positively avoided and that upon separating the rocket assist frame from the craft, portions of the thrust rods are also removed. Particularly in the case of a flying wing type of craft, relatively long thrust rods are needed. For avoiding any damage of the propeller during the separation the plane of separation, generally, between aircraft and rocket assist frame should be situated within the propeller circle plane or behind thereof. In such a case, however, the thrust rods, if they were to remain in their entirety with the aircraft, would not only introduce additional drag but, in case of landing, for example, following a parachute deployment or on contact with the ground, an additional interference in reliability of function is produced. In addition, of course, unnecessary thrust rods or portions thereof amount to a considerable parasitic weight load for the craft. The invention remedies the situation because at least a portion of the thrust rods will be jettisoned following the takeoff phase together with the rocket frame.

The thrust forces of the rocket assist propulsion system will be reacted via the pivot points of the thrust rods and from there through receiving points directly into the fuselage. Adjustability of the thrust rod mount in relation to the frame as well as the particular orientation of pivot axes mentioned earlier permit the reaction and attenuation of any lateral loads.

DESCRIPTION OF THE DRAWINGS

The specification concludes with claims particularly pointing out and distinctly claiming the subject matter which is regarded as the invention. It is believed, however, that the invention, the objects and features of the invention, and further objects, features and advantages thereof will be better understood from the following description taken in conjunction with the accompanying drawings in which:

FIG. 1 is a side elevation of a craft constructed and improved in accordance with the preferred embodiment of the present invention for practicing the best mode thereof;

FIG. 2 illustrates the righthand portion of certain structures illustrated in FIG. 1 but on an enlarged scale;

FIG. 3 illustrates a top elevation of a detail of the device shown in FIG. 2, the figure shows in particular of a righhand part of the arrangement shown in FIG. 2, and illustrated from the front;

FIG. 4 is a top elevation of the device shown in FIG. 2;

FIG. 5 illustrates a modified version of practicing the invention, the modification being dictated by a different structure of the craft to which the invention is applied and, therefore, this figure constitutes simply an adaptation of the preferred embodiment of the present invention for practicing the best mode thereof;

FIG. 6 shows in perspective view the device shown in FIG. 5, but at a different stage of deployment and;

FIG. 7 illustrates the craft shown in FIG. 1 in the instant of separation of the craft proper from the rocket assist device.

Proceeding, now, to the detailed description of the drawings, FIG. 1 illustrates, generally, a reusable, unmanned aircraft, also called a drone. Aircraft of this type are, for example, used for purposes of reconnaissance. The front portion 2 of the fuselage 1 receives the payload, such as electronic surveillance equipment, and is therefore configured and constructed accordingly, i.e., in adaptation for the intended use. The rear or tail portion of the fuselage, particularly in the interior thereof, is provided with a propeller drive, not shown, but driving directly and immediately a propeller 3, which is indicated in dash/dot lines only. Reference numeral 4 refers to the air foil wings for sustaining aerodynamic flight of the craft and reference numeral 5 refers to the rudder of the craft.

The respective rear edges of the two airfoils 4 and of the rudder 5 are provided to serve as support for thrust rods 6, 7, and 8. The thrust rod 7 is not visible in FIGS. 1 and 2, but, as indicated within the line of view of the drawings, the thrust rod 7 is disposed exactly behind the thrust rod 6, of course, at an appropriate distance therefrom. These thrust rods 6, 7, and 8 support a frame 9, which is provided to receive, support and mount a rocket assist type propulsion system to be operative during the takeoff phase. This frame 9 is comprised, as far as this specific embodiment is concerned, of three star-like or star pattern-like arranged, similarly configured stabilizing surfaces and airfoils 10, 11, and 12, respectively, and the rocket propulsion drive 13 serving as the takeoff assist is provided in the common center of these three surfaces as they are arranged to emerge radially from such a center line.

As can be seen specifically from FIG. 1, the aerodynamic wing type airfoils 4 as well as the rudder 5 of the craft itself have rearwardly arranged projections 14 and 15. The projection 15 merges immediately with the thrust rod 8, being in this case secured therewith to the rudder 5. On the other hand, the projections 14 (only one being visible in FIG. 1 for reasons above) have a spherically shaped, rearwardly extending end portion zone or range which serves as abutment and engagement point for the front ends 16 of thrust rods 6 and 7.

FIG. 2 illustrates in greater detail these aspects of mounting. This figure particularly shows that the front face 16 of the thrust rod 6 is concavely configured and therewith matches the spherically shaped end and area of engagement of the projection 14, the latter being part of the wing 4. Of course, the situation is quite similar with regard to the thrust rod 7 because in relation to a vertical plane through the longitudinal axis of the craft, the arrangement is strictly symmetrical.

FIGS. 2 and 3, furthermore, illustrate that the thrust rods 6 and 7 are linked with their respective rear ends to the stabilizer surfaces 11 and 12, respectively. Herein, the pivot axis A and $A^1$ established by the respective pivot or rotating hinges 17 and $17^1$ are at least approximately at right angles towards the respective stabilizer surfaces 11 and 12, which run in radially outward direction. The outer edges of the stabilizer foils 11 and 12 are configured so that the thrust rods 6 and 7, respectively, engage them in contour matching relationship. FIG. 2, moreover, illustrates that the stabilizer surface 10 in this particular instance is provided with a integral or otherwise secured cylindrical projection 18 having a similar diameter as the thrust rod 8. The thrust rod 8 in this case, as already mentioned, is secured to the rudder 5 of the craft. The projection 18 is adjusted in the illustrated case as to its length extension for purposes of overall adjustment. The front face of the projection 18 is concavely configured matchingly corresponding to the spherical shape of the end of thrust rod 8.

In the example illustrated in FIGS. 2, 3, and 4, the thrust rods 6 and 7 are loaded by means of springs 19 acting on these thrust rods at a certain distance from the pivot hinges 17 and $17^1$. These springs urge as the case may be, the respective front ends of the thrust rod 6 or 7 in outward direction through pivoting about the respective pivot axis A or $A^1$. FIG. 4 illustrates also that the pivot axes A and $A^1$ are radially outwardly offset in relation to the longitudinal axis of the respective thrust rods 6 and 7, and at a certain distance therefrom, so as to be able to take up any lateral loads that may act upon the craft and these parts in particular. For exactly the same reason, the thrust rods 6 and 7 should be locked to the respective stabilizer foils 11 and 12 during the takeoff phase, to be released following takeoff.

FIGS. 5 and 6 illustrate a modification in the form of a second example of practicing the invention and it differs from the first one in that in the case of FIGS. 5 and 6 the particular type of spring, springs 19, are omitted and instead guide or pilot sheets 24 and 25 are provided. These sheets 24 and 25 are arranged at an angle in relation to the respective longitudinal axes of the two thrust rods 26 and 27. Thus, during the takeoff phase, the thrust rods 26 and 27 abut the respective associated stabilizer surfaces 21 and 22, and still in the takeoff phase, these rods are oriented obliquely in relation to the longitudinal axis of the aircraft so that, in fact, the sheets 24 and 25 orientated vis-a-vis oncoming airflow by a particular angle of attack. The stabilizer surface 20 as well as the projection 28 correspond to the parts 10 and 18, respectively, of the embodiment shown in FIGS. 1 through 4.

FIG. 7 serves as an explanation for the operation involving such a craft whereby this description is applicable in principle to both examples given above. During the takeoff phase, the rocket assist propulsion system 13 is of course the principal thrust-producing device and its carrying frame 9 bears, by means of its thrust rods 6 and 7, against the abutment points 14 and the projection 18 bears against the thrust rod 8 in the embodiment and example shown in FIGS. 1 through 4. In the embodiment shown in FIGS. 5 and 6, the thrust rods 26 and 27, on one hand, and the projection 28, on the other hand, bear against the respective receiving elements, being substantially the same as in the other embodiments. The cooperation of the spherical and concavely shape surfaces in these points, as well as in the eccentrically arranged pivot joints 17 (eccentric in relation to the thrust rod) results in compensating forces. The forces to be compensated are the forces exerted by the springs 19 in one embodiment and the guide sheets 24 and 25 in the other embodiment, which tend to pivot the respective thrust rods in outward direction. The compensating forces result from friction acting in the several engaging surfaces and also includes the force produced by the propulsion system and being directed towards the booster star. Only when the thrust of the takeoff assist rocket decreases the compensating forces will be insufficient to obtain the aforementioned compensation and now the thrust rods 6 and 7 in one embodiment and 26 and 27 in the other embodiment will, in fact, be forced into outwardly directed pivot position by the respective spring action. Accordingly, the frame 9 is released from the craft and drops to ground. Since the thrust rods being linked to the frame 9 will immediately be pivoted into the outermost position, they cannot collide with the propeller during the separation phase so that damage of the craft and the regular propulsion system thereof is positively avoided.

The invention is not limited to the embodiments described above, but all changes and modifications thereof not constituting departures from the spirit and scope of the invention are intended to be included.

We claim:

1. Unmanned craft having a fuselage, there being a propeller drive with a propeller arranged in the tail portion of the fuselage for purposes of cruising, there being a releasable rocket assist propulsion system for the takeoff phase, the system having a frame, the improvement comprising:

at least two thrust rods being secured to said frame and releasably engaging peripheral points of said craft, said thrust rods extending in forward direction and being radially pivotal in outer direction, and having front ends;

means on the wings of the craft establishing support points for engaging said front ends in contour-matching relationship but being disengageable therefrom in direct response to a speed differential between the fuselage and the assist system; and means causing forces to act laterally on said thrust rods ending to pivot them in radial outer direction so that the rods are pivoted out of the way of the propeller upon release of the assist system.

2. The improvement as in claim 1 said thrust rods being locked to said frame during the takeoff phase.

3. The improvement as in claim 1, said causing means being springs.

4. The improvement as in claim 1, said causing means being deflecting pilot sheets on the thrust rods.

5. The improvement as in claim 1, said causing means being the pivot axes of the thrust rods offset in relation to an axis of the respective thrust rod.

* * * * *